(12) United States Patent
Ponnuru et al.

(10) Patent No.: US 11,582,068 B2
(45) Date of Patent: Feb. 14, 2023

(54) SCALABLE MECHANISM FOR OPTIMIZED APPLICATION PERFORMANCE IN SD-WAN

(71) Applicant: Cisco Technology, Inc., San Jose, CA (US)

(72) Inventors: Laxmikantha Reddy Ponnuru, Santa Clara, CA (US); Samir Thoria, Saratoga, CA (US); Managa Sunitha Arun Kumar, Sunnyvale, CA (US); Satyajit Das, Livermore, CA (US); Ram Dular Singh, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 160 days.

(21) Appl. No.: 17/091,240

(22) Filed: Nov. 6, 2020

(65) Prior Publication Data

US 2022/0029857 A1 Jan. 27, 2022

Related U.S. Application Data

(60) Provisional application No. 63/055,995, filed on Jul. 24, 2020.

(51) Int. Cl.
*H04L 12/46* (2006.01)
*H04L 45/00* (2022.01)

(52) U.S. Cl.
CPC .......... *H04L 12/4633* (2013.01); *H04L 45/22* (2013.01)

(58) Field of Classification Search
None
See application file for complete search history.

(56) References Cited

U.S. PATENT DOCUMENTS

| 2020/0252234 | A1 | 8/2020 | Ramamoorthi et al. |
| 2021/0036887 | A1* | 2/2021 | Meng ............... H04L 12/66 |

OTHER PUBLICATIONS

"The Role of Dynamic IPSEC Tunnels in Modern SD-Wan Networks," Cisco.com, Dec. 12, 2019.
"Oracle® SD-WAN Edge Features Guide," docs.oracle.com, Jun. 2020.
"Cisco SD-WAN Design Guide," cisco.com, Jul. 2020.
"EANTC Independent Test Report Contrail Juniper SD-WAN Solution," eantc.de, Sep. 2018.

* cited by examiner

*Primary Examiner* — Christine T Duong
(74) *Attorney, Agent, or Firm* — Baker Botts L.L.P.

(57) ABSTRACT

The present disclosure is directed to a mechanism for optimized application performance in SD-WAN, and includes the steps of receiving initial traffic packets at a first site for transmission to a second site; determining whether a direct tunnel is established between the first site and the second site based on a state of the second site, the state comprising an active state indicating that a direct tunnel is established between the first and second sites or an inactive state indicating that the direct tunnel is not established between the first and second sites; and in response to determining that the direct tunnel is not established, determining that the initial packets satisfy a configured trigger; forwarding the initial packets to the second site via a backup path; establishing the direct tunnel between the first and second sites; and forwarding subsequent traffic packets to the second site via the established direct tunnel.

20 Claims, 4 Drawing Sheets

SCALABLE MECHANISM FOR OPTIMIZED APPLICATION PERFORMANCE IN SD-WAN

CROSS-REFERENCE TO RELATED APPLICATIONS

This application claims priority to and the benefit of U.S. Provisional Application No. 63/055,995, filed on Jul. 24, 2020, which application is incorporated herein by reference in its entirety.

TECHNICAL FIELD

The present disclosure generally relates to application performance, and more specifically to systems and methods for scalable mechanism for optimized application performance in a software-defined wide access network (SD-WAN).

BACKGROUND

Many SD-WAN implementations support a full-mesh topology, wherein each site is directly connected to every other site in the network. An edge router at each site may establish transport links, such as Internet Protocol Security (IPsec) tunnels, to other remote sites and bidirectional forwarding detection (BFD) probes may be used to monitor the path characteristics of the transport links. In a full-mesh network having numerous sites, low-end edge routers having reduced memory and/or processing capabilities may not be able to sustain connections with every other remote site.

DESCRIPTION OF EXAMPLE EMBODIMENTS

Overview

Figure 1A:
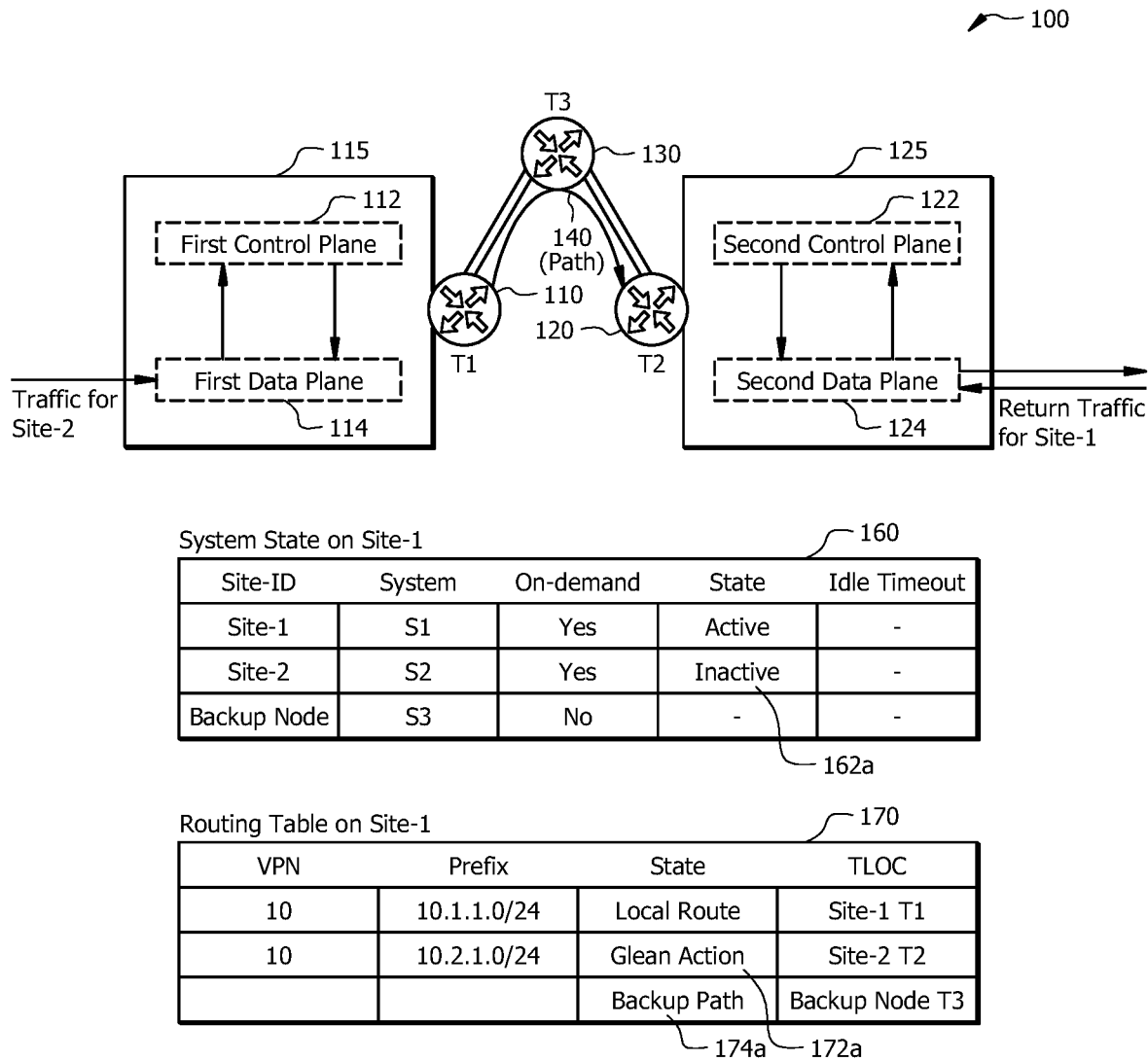
FIG. 1A illustrates a scalable system for establishing an on-demand direct tunnel, including system states and routing table configurations prior to establishing the on-demand tunnel, in accordance with certain embodiments.

According to an embodiment, a system may include one or more processors and one or more computer-readable non-transitory storage media comprising instructions that, when executed by the one or more processors, cause one or more components of the system to perform operations including, receiving, at a first data plane associated with a first site, initial packets of traffic to be transmitted to a second site; determining whether a direct tunnel is established between the first site and the second site based on a state of the second site, the state comprising either an active state or an inactive state, the active state indicating that a direct tunnel is established between the first site and the second site and the inactive state indicating that the direct tunnel is not established between the first site and the second site; and in response to determining that the direct tunnel is not established between the first site and the second site, performing the steps of: determining that the initial packets of traffic satisfy a configured trigger for establishing the direct tunnel between the first site and the second site; forwarding the initial packets of traffic to the second site via a backup path; establishing the direct tunnel between the first site and the second site; and forwarding subsequent packets of traffic from the first site to the second site via the established direct tunnel.

Moreover, the step of establishing the direct tunnel between the first site and the second site may further include: updating a routing table to mark the second site in the active state, thereby activating flow discovery of the second site; downloading transport locators (TLOCs) learned from the second site to the first data plane of the first site; provisioning the direct tunnel from the first site to the second site; and establishing a first side of a bidirectional forwarding detection (BFD) session to transmit first echo packets from the first site to the second site via the direct tunnel provisioned from the first site to the second site.

Moreover, the operations may include accepting a second side of the BFD session to receive second echo packets transmitted from the second site to the first site via the direct tunnel provisioned from the second site to the first site.

Additionally, the determination that the first echo packets have been transmitted to the second site and the second echo packets have been received at the first site may establish the direct tunnel.

Moreover, the configured trigger for establishing the direct tunnel may include a packet trigger; an application-based trigger; or a flow-duration trigger.

Furthermore, the direct tunnel may be established on demand and may allow for network scalability and circumvention of a full-mesh deployment.

According to another embodiment, a method may include the steps of receiving, at a first data plane associated with a first site, initial packets of traffic to be transmitted to a second site; determining whether a direct tunnel is established between the first site and the second site based on a state of the second site, the state comprising either an active state or an inactive state, the active state indicating that a direct tunnel is established between the first site and the second site and the inactive state indicating that the direct tunnel is not established between the first site and the second site; and in response to determining that the direct tunnel is not established between the first site and the second site, performing the steps of: determining that the initial packets of traffic satisfy a configured trigger for establishing the direct tunnel between the first site and the second site; forwarding the initial packets of traffic to the second site via a backup path; establishing the direct tunnel between the first site and the second site; and forwarding subsequent packets of traffic from the first site to the second site via the established direct tunnel.

According to yet another embodiment, one or more computer-readable non-transitory storage media may embody instructions that, when executed by a processor, cause the performance of operations, including receiving, at a first data plane associated with a first site, initial packets of traffic to be transmitted to a second site; determining whether a direct tunnel is established between the first site and the second site based on a state of the second site, the state comprising either an active state or an inactive state, the active state indicating that a direct tunnel is established between the first site and the second site and the inactive state indicating that the direct tunnel is not established between the first site and the second site; and in response to determining that the direct tunnel is not established between the first site and the second site, performing the steps of: determining that the initial packets of traffic satisfy a configured trigger for establishing the direct tunnel between the first site and the second site; forwarding the initial packets of traffic to the second site via a backup path; establishing the direct tunnel between the first site and the second site; and forwarding subsequent packets of traffic from the first site to the second site via the established direct tunnel.

Technical advantages of certain embodiments of this disclosure may include one or more of the following. The systems and methods described herein may address limitations in full-mesh and hub-and-spoke deployments by proposing a hub-and-spoke deployment that allows, inter alia, latency and/or bandwidth-heavy applications to selectively switch to direct, on-demand, site-to-site forwarding. The direct tunnels may be brought up on-demand and may be torn down when not needed, thereby providing an improved application experience in a scalable mechanism that does not require a full mesh of tunnels.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

A typical SD-WAN may comprise a plurality of remote sites. Each remote site may be associated with an edge router which may act as a gateway to facilitate the sending and receiving of data and traffic to and from other remote sites. SD-WAN allows for various overlay network topologies, including full-mesh and hub-and-spoke.

In the full-mesh overlay design, every edge router may establish overlay tunnels to and corresponding BFD sessions with every other edge router in the network. Thus, in a SD-WAN network having hundreds or thousands of sites, there may be thousands or tens of thousands of corresponding tunnels provisioned throughout the network. While the full-mesh design allows for direct site-to-site connectivity without intermediate hops, it poses a challenge with respect to tunnel scalability. For example, because a SD-WAN network may comprise edge routers of different capability, including low-end branch routers having low or reduced processing power and/or memory, supporting a full-mesh of overlay tunnels may not be feasible.

In a hub-and-spoke design, one site may act as a hub, and other sites may act as spokes. Network communication between two spokes must travel through the hub. However, because the hub serves as a choke point, it must be engineered with a high bandwidth to handle all spoke traffic. Additionally, traffic forwarding between sites is forwarded via an intermediate hop to the hub site. This introduces latency for site-to-site communication, and because some applications are latency sensitive, indirect forwarding may impact application performance.

The present disclosure proposes to address these and other limitations of full-mesh and hub-and-spoke deployments by proposing a hub-and-spoke arrangement that allows certain sites (e.g., sites having latency or bandwidth-heavy applications) to selectively switch to direct site-to-site forwarding. The direct site-to-site tunnels may be brought up on-demand and may be torn down when not needed, thus providing an improved application experience in a scalable mechanism that does not require a full-mesh of site-to-site tunnels.

Figure 1B:
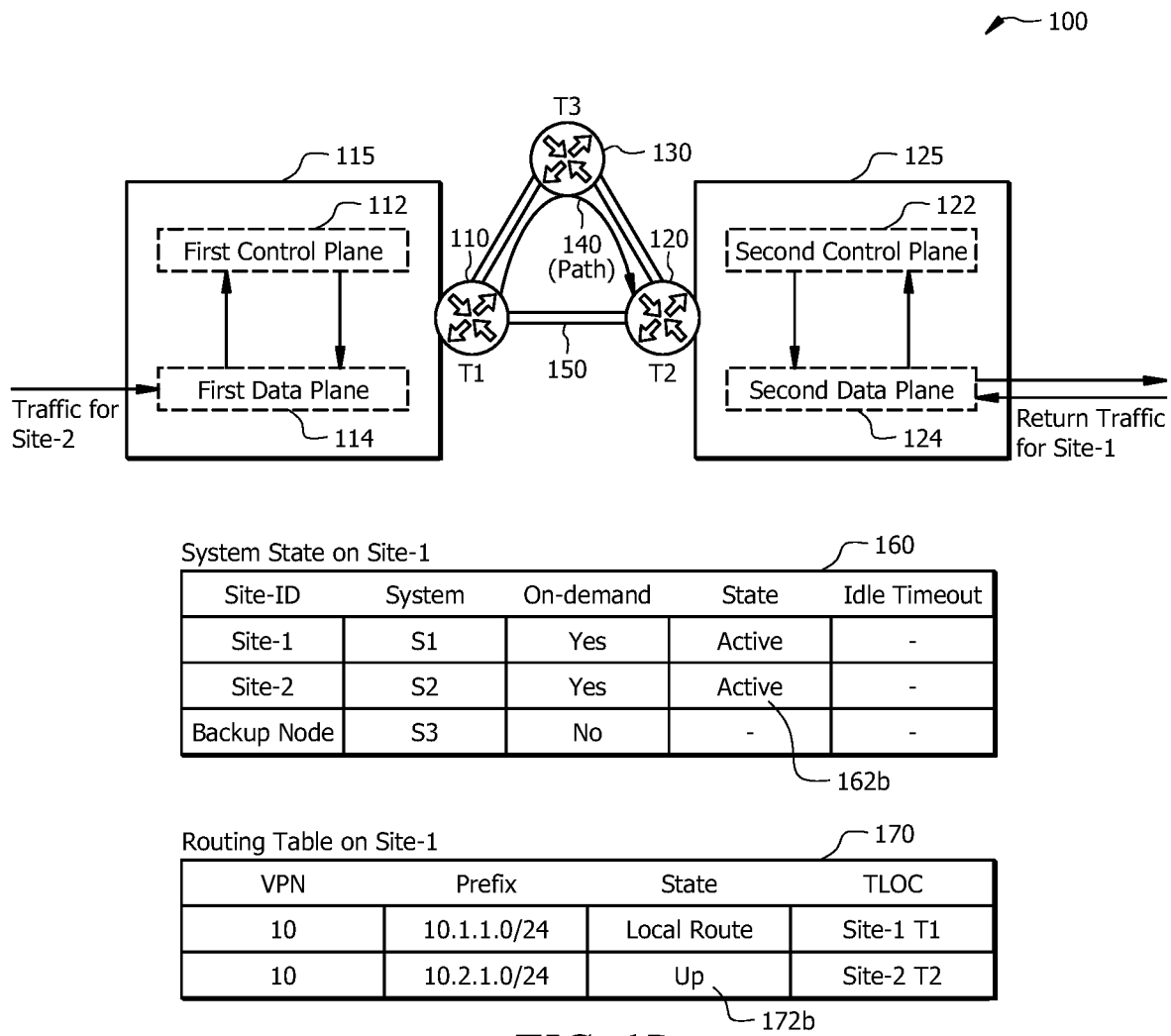
FIG. 1B illustrates a scalable system for establishing an on-demand direct tunnel, including system states and routing table configurations when establishing the on-demand tunnel, in accordance with certain embodiments.

FIGS. 1A and 1B depict a scalable system 100 for establishing an on-demand direct tunnel, in accordance with the present disclosure. FIG. 1A shows the system configuration, corresponding system states, and the routing table prior to establishing the on-demand tunnel. FIG. 1B shows the system configuration, corresponding system states, and the routing table when the on-demand site-to-site tunnel is established. In other words, system 100 is depicted in FIGS. 1A and 1B in "before" and "after" configurations, respectively. In an embodiment, system 100 corresponds to a software-defined wide access network (SD-WAN).

System 100 may comprise a first edge router located at a first physical site in a hub-and-spoke deployment (the first edge router hereafter referred to as a "first site" 110 (also shown in FIGS. 1A and 1B as "T1")), and a second edge router located at a second physical site in the hub-and-spoke deployment (the second edge router hereafter referred to a "second site" 120 (also shown in FIGS. 1A and 1B as "T2")). For purposes of illustration, the first site 110 and the second site 120 may be remote sites corresponding to spokes in a hub-and-spoke network. The first site 110 may receive traffic to transmit to the second site 120.

The first site 110 may be associated with a first control plane 112 and a first data plane 114 that together comprise a first control module 115, such as a SDWAN routing software operating system (OS). Similarly, the second site 120 may be associated with a second control plane 122 and a second data plane 124 that together comprise a second control module 125. System 100 may further include a backup node 130 (also shown in FIGS. 1A and 1B as "T3") having an associated backup path 140 through which traffic may be transmitted between the first site 110 and the second site 120 when a direct tunnel is not established between the first site 110 and the second site 120. It is to be understood that first and second sites 110, 120 are shown in FIGS. 1A and 1B for purposes of illustration, and that system 100 may include any number of remote sites and/or backup nodes.

The first and second sites 110, 120 may be enabled with a mechanism to provision on-demand tunnels, in accordance with the present disclosure. Referred to as "on-demand sites," the first and second sites 110, 120 may learn the WAN interface (also referred to as transport locators (TLOC) in SDWAN, and each identified with a system IP address, color and encapsulation), as well as network prefixes (which is an aggregation of IP addresses) of all other remote sites. So, in the control plane of a given on-demand site, e.g., the first control plane 112 of the first site 110, the on-demand tunnel network will have the same state as a full-mesh tunnel network, along with a backup path. The first control plane 112 may download to the first data plane 114 routes with the backup path 140 as well as the remote TLOCs that represent a potential direct path between the first site 110 and any other site. However, a direct tunnel is established to a remote site only on-demand and as needed.

In accordance with the present disclosure, each on-demand site, e.g., the first and second sites 110, 120, may be associated with a state, namely an active state or an inactive state. FIG. 1A depicts system 100 when the second site 120 is in the inactive state. The inactive state may indicate that a direct tunnel is not established to the second site 120, and that no active traffic is being transmitted between the first site 110 and the second site 120 that would trigger an on-demand tunnel setup. As such, all traffic received at the first site 110 that is intended for the second site 120 will be transmitted through the backup node 130 via the backup path 140. Moreover, the system state table 160 and routing table 170 associated with the first site 110 (referred to as "Site-1" in the system state table 160) shows that the second site 120 (referred to as "Site-2") is in the inactive state (shown as "Inactive" 162*a* in the system state table 160), and that remote TLOCs to the second site are also inactive. As a result, there is no bidirectional forwarding detection (BFD) between the first site 110 and the second site 120, and the prefix of the second site 120 (referenced in the routing table 170 as "Site-2 T2") is installed with a "Glean Action" 172*a* and any traffic to the second site 120 is set to be forwarded through the backup node 130 (referenced in routing table 170 as "Backup Node T3") via the backup path 140 (referenced in the routing table 170 as "Backup Path" 174*a*). The system state table 160 shows the state of the first site 110 as "Active" because the first site 110 is a local site; local sites are always in the active state and ready to establish direct tunnels to remote sites. While the FIG. 1A shows the system state table 160 and routing table 170 for the first site 110, it is to be understood that similar tables will be available for all other remote sites, e.g., the second site 120.

FIG. 1B depicts the system 100 when the second site 120 is in the active state. In the active state, the on-demand direct tunnel 150 is set up from the first site 110 to the second site 120, and active traffic is transmitted to and/or received from the second site 120 via the direct tunnel 150. Moreover, the system state table 160 and the routing table 170 associated with the first site 110 (referred to as "Site-1" in the system state table 160) shows that the second site (referred to as "Site-2" in the system state table 160) is in the active state (shown as "Active" 162*b* in the system state table 160), and that remote TLOCs to the second site 120 are also active, which means that BFD is set up between the first site 110 and the second site 120. Thus, in the active state, the direct tunnel is tracked for active traffic. Additionally, the prefix of the second site 120 is installed as "UP" 172*b*, which means that the direct tunnel 150 is set up and all traffic arriving at the first site 110 and intended for the second site 120 will be transmitted through the direct tunnel 150. When there is no traffic transmitted through the direct tunnel 150 for a predetermined threshold period of time, as determined through BFD tracking of active traffic in the direct tunnel 150, the direct tunnel 150 may be torn down and the second site 120 may revert to the inactive state. In an embodiment, the state of the second site may drive the TLOC status, and the TLOC status may in turn drive the prefix state.

With continued reference to FIGS. 1A and 1B, the specific operation of system 100 will now be described. First, initial packets of traffic to be transmitted to the second site 120 may be received at the first data plane 114 of the first site 110. The initial packets of traffic may include the host prefix associated with the second site 120, which may indicate that the traffic is intended for the second site 120. The first date plane 114 may determine whether a direct tunnel is established between the first site 110 and the second site 120 based on a state of the second site 120. In particular, the first data plane 114 may evaluate the routing table 170 associated with the first site 110 to determine whether the state of the second site 120 is active or inactive. If the state of the second site 120 is active, the first data plane 114 may determine that a direct tunnel 150 is already established between the first site 110 and the second site 120, and may forward the initial packets of traffic and subsequent packets of traffic that are received at the first site 110 and that are intended for the second site 120 to the second site 120 via the direct tunnel 150. If the state of the second site 120 is inactive, the first data plane 114 may determine that a direct tunnel 150 is not established between the first site 110 and the second site 120 and the following steps may then commence.

In order to determine whether to establish the direct tunnel 150 between the first site 110 and the second site 120, the first data plane 114 may determine whether the initial packets of traffic received at the first site 110 satisfy a condition or trigger that has been configured for the first site 110. In other words, if the initial packets of traffic satisfy the configured trigger, then the direct tunnel 150 may be established between the first site 110 and the second site 120. In an embodiment, only one trigger may be configured in the system 100. However, it is to be understood that the disclosure is not to be limited and that more than one trigger or a combination of triggers may also be configured. The configured trigger may include: 1) a packet-based trigger; 2) an application-based trigger; and/or 3) a flow duration trigger. Each of these will be described in turn.

For a packet-based trigger, any traffic (independent on type, size, flow duration, etc.) may trigger the establishing of the on-demand direct tunnel 150. As such, for a packet-based trigger, the "Glean Action" may be programmed for all prefixes. Thus, any traffic hitting any prefix may trigger the direct tunnel set up.

Next, for an application-based trigger, a user may configure a policy that identifies particular applications (e.g., high bandwidth or high latency applications, business-critical applications, video applications, etc.) for direct site-to-site tunnel provisioning. Thus, when traffic arrives at the first site 110, an application classification look-up may be performed by the first data plane 114, and if the traffic matches the configured application(s), the on-demand direct tunnel 150 may be set up.

Finally, for a flow duration trigger, a policy may be configured to enable direct tunnel setup only if the traffic exceeds a threshold flow duration. For example, a user may decide that short traffic flows (e.g., lasting a few seconds, 1 min, etc.) do not require the provisioning of direct tunnel because by the time the tunnel is established, the traffic flow may have ended. Therefore, the flow duration trigger avoids the setting up and tearing down of tunnels for traffic having short-lived flows. The "Glean Action" may be used to observe the duration of the traffic flow received at the first site 110 and trigger notification to the first control plane 112 based on the configured threshold.

While the present disclosure has described three triggers that may be configured for determining whether to establish to direct tunnel, it is to be understood that the present disclosure is not to be so limited. The present disclosure contemplates that any number, manner, or combination of trigger(s) may be configured, and if satisfied, may result in the establishing of the direct tunnel 150.

If it is determined that the initial packets of traffic received at the first site 110 satisfy the configured trigger(s), the first data plane 114 may forward the initial packets of traffic to the second site 120 through the backup node 130 via the backup path 140. Specifically, because the prefix associated with the second site 120 will be pointing to the "Glean Action" 172*a* (as shown in the routing table 170), these initial packets of traffic will be forwarded through the backup node 130 (referenced in routing table 170 as "Backup Node T3") via the backup path 140 (referenced in the routing table 170 as "Backup Path" 174*a*).

Next, the first data plane 114 may begin the series of steps to establish the direct tunnel 150 between the first site 110 and the second site 120. Specifically, the first data plane 114 may send a Glean Inter Process Communication ("IPC") message to the first control plane 112 to update the system state table 160 to mark the second site 120 as in the active state (i.e., "Active" 162*b*), thereby activating the flow discovery of the second site 120. The first control plane 112 may download all transport locators (TLOCs) of the second site 120 learned through the flow discovery of the second site 120 to the first data plane 114 of the first site 110 and provision the direct tunnel 150 from the first site 110 to the second site 120. The first control plane 112 may also establish a first side of a bidirectional forwarding detection (BFD) session, which may trigger the transmission of echo packets from the first site 110 to the second site 120 via the direct tunnel 150 provisioned from the first site 110 to the second site 120. The echo packets sent from the first site 110 may be referred to as "first echo packets" to distinguish between echo packets sent from the second site 120, as described below. By "provisioning" the direct tunnel, it is meant that an IPSec Tunnel is setup from the first site 110 to the second site, thereby enabling the first side of the BFD session and triggering the transmission of first echo packets from the first site 110 to the second site 120. The direct tunnel is not yet in an "UP" state and traffic is not yet flowing directly between the first site 110 and the second site 120.

Meanwhile, the second site 120 may receive the initial packets of traffic from the first site 110 via the backup path 140. A second data plane 124 associated with the second site 120 may perform a lookup for the traffic. The source prefix may be pointing to a Glean Action for the first site 110 and backup path 140, thereby triggering a series of steps from the second site 120 to the first site 110, the steps corresponding in reverse to the steps described above for the provisioning of the direct tunnel from the first site 110 to the second site 120.

Specifically, the second data plane 124 may send a Glean IPC message to the second control plane 122 to update the system state table 160 to mark the first site 110 as in the active state, thereby activating the flow discovery of the first site 110. On receiving the Glean IPC message, the second control plane 122 may download all TLOCs learned from the first site 110 to the second data plane 124 of the second site 120 and provision the direct tunnel 150 from the second site 120 to the first site 110. The second control plane 122 may also establish the second side of the BFD session, which may trigger the transmission of echo packets from the second site 120 to the first site 110 via the provisioned direct tunnel 150. The echo packets sent from the second site 120 may be referred to as "second echo packets" to distinguish from first echo packets sent from the first site 110, as described above. The first site 110 may accept the second side of the BFD session to receive second echo packets transmitted from the second site 120 to the first site 110 via the direct tunnel 150 provisioned from the second site 120 to the first site 110.

Once it has been determined that the first echo packets have been transmitted to (and/or received at) the second site 120 and the second echo packets have been transmitted to (and/or received at) the first site 110, the direct tunnel 150 may be established between the first site 110 and the second site 120. In other words, since both sites have successfully sent echo packets, the direct tunnel will come to an "UP" state 172b, as reflected in the routing table 170 of FIG. 1B. By "establishing" the direct tunnel, it is meant that the direct tunnel is in an "UP" state and that traffic may flow between the first site 110 and the second site 120 via the direct tunnel 150. Since the direct tunnel 150 setup is triggered from both ends of the direct tunnel 150, network address translation (NAT) is addressed in the network.

Once the on-demand direct tunnel 150 is established and "UP," the direct path of the direct tunnel 150 is considered a better path as compared to the backup path 140, and therefore the backup path 140 is deleted and the direct tunnel path is added in the first and second data planes 114, 124 of the first and second sites 110, 120. Once the on-demand direct tunnel 150 is established and "UP", all subsequent packets of traffic flow from the first site 110 to the second site 120 via the direct tunnel 150. In an embodiment, with the exception of a direct tunnel established based on an application-based trigger, all subsequent packets of traffic from the first site 110 to the second site 120 may be transmitted through the direct tunnel 150, regardless of application type. In other words, even though the direct tunnel 150 may have been established in response to a first traffic flow, the direct tunnel 150 may be used for later flows of traffic transmitted from the first site 110 to the second site 120.

In an embodiment, the system 100 may include a mechanism for idle timeout. Specifically, a predetermined threshold idle period may be established by a user, or established by default. If no traffic is transmitted through the direct tunnel 150 for that threshold period of time (i.e., the direct tunnel is idle for the threshold period of time), as determined by the first control plane 112, the on-demand direct tunnel may be torn down and the designation of the second site 120, as reflected in the system state table 160, may return to the inactive state (e.g., "Inactive" 162a). Absent a configured idle timeout, the default timeout may be, e.g., 10 minutes.

Additionally, both the first site 110 and the second site 120 may track traffic activity in both directions (from the first site 110 to the second site 120, as well as from the second site 120 to the first site 110). Thus, activity from either side of the tunnel may support keeping the direct tunnel 150 up.

In accordance with the present disclosure, the direct tunnel may be established on demand and may allow for network scalability and circumvention of a full-mesh deployment. In other words, spoke sites in a hub-and-spoke topology may create direct tunnels with particular other sites, as needed, thereby bypassing the requirement of a conventional full-mesh deployment for the establishment of direct tunnels.

Figure 2:
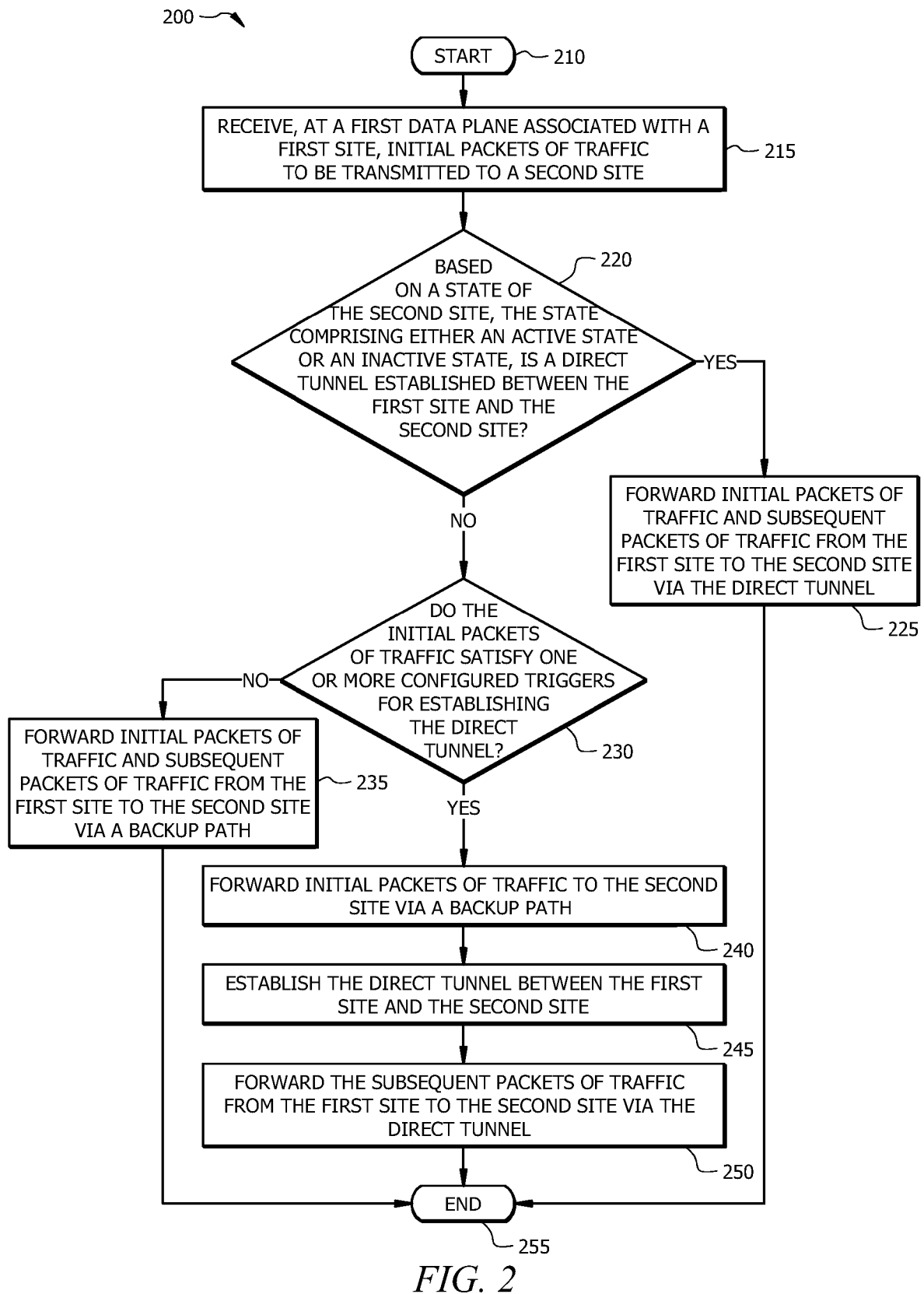
FIG. 2 illustrates a flow diagram of a method for establishing an on-demand direct tunnel, in accordance with certain embodiments.

Reference is now made to FIG. 2, wherein is shown a flow diagram of a method 200 for establishing an on-demand direct tunnel, in accordance with the present disclosure. The steps of method 200 may be in accord with the operations outlined in conjunction with the system 100 of FIGS. 1A and 1B. As such, similar and corresponding terms described in conjunction with FIGS. 1A and 1B may have the same meaning when used in conjunction with method 200 of FIG. 2. Additionally, the present disclosure incorporates by reference the description of system 100, as shown in FIGS. 1A and 1B, for the purposes of explaining, expounding upon, or otherwise clarifying the steps of method 200.

Method 200 may be performed in conjunction with a system that includes the following components: a first edge router located at a first physical site in a hub-and-spoke deployment (the first edge router hereafter referred to as a "first site"), and a second edge router located at a second physical site in the hub-and-spoke deployment (the second edge router hereafter referred to a "second site"). The first site may be associated with a first control plane and a first data plane that together comprise a first control module, such as a SDWAN routing software OS. Similarly, the second site may be associated with a second control plane and a second data plane that together comprise a second control module, which may also include a SDWAN routing software OS. For purposes of illustration, the first site and the second site may be remote sites corresponding to spokes in a hub-and-spoke network, and the first site may receive traffic to transmit to the second site. A backup node having an associated backup path may be established as a default path through which traffic may be transmitted from the first site to the second site when a direct tunnel is not established between the first site and the second site.

Method 200 is generally described in the present disclosure as performed from the perspective of the first site, and specifically from the perspective of the first data plane and/or the first control plane of the first site. However, it is to be understood that the method 200 is not to be so limited, and may be performed by any component, element, or device, as known and understood by one of skill in the art.

The method may begin at step 210. At step 215, initial packets of traffic may be received at a first data plane associated with the first site, wherein the initial packets of traffic are intended for transmission to the second site. The initial packets of traffic may include the host prefix associated with the second site, which may indicate that the traffic is intended for the second site.

At step 220, a determination may made as to whether a direct tunnel is established between the first site and the second site based on a state of the second site, the state comprising either an active state or an inactive state, the active state indicating that a direct tunnel is established between the first site and the second site and the inactive state indicating that the direct tunnel is not established between the first site and the second site.

To further explain, the first and second sites may be "on-demand sites" having the capability to establish or provision direct tunnels on demand, as needed. In accordance with the present disclosure, each of the first and second sites may be associated with a state, namely an active state or an inactive state, which may be reflected in state table or routing table associated with the first and/or second sites (by way of illustration, FIGS. 1A and 1B depict a system state table 160 and a routing table 170 associated with the first site, showing the state of the second site as inactive 162a in FIG. 1A, and active 162b in FIG. 1B). The inactive state may indicate that a direct tunnel is not established to the second site, and that no active traffic is being transmitted to or from the second site. As such, when the second site is the inactive state, all traffic received at the first site that is intended for the second site may be transmitted through the backup node via the backup path. Specifically, when the second site is in the inactive state, remote TLOCs to the second site are also inactive. As a result, there is no bidirectional forwarding detection (BFD) between the first site and the second site, and the prefix associated with the second site is installed with a "Glean Action." Additionally, the routing table may indicate that any traffic from the first site to the second site is forwarded to the second site through the backup node via the backup path.

The active state may indicate that a direct tunnel is established to the remote site, so all traffic received at the first site that is intended for the second site will be transmitted through the direct tunnel to the second site. When the remote second site is in the active state, the remote TLOCs to the second site are also active, which means that BFD is set up between the first site and the second site. Thus, in the active state, the direct tunnel is tracked for active traffic. Additionally, the prefix of the remote second site is installed as "UP", which means that the direct tunnel is set up for traffic between the first site and the second site.

Thus, in accordance with step 220, the first data plane of the first site may evaluate the routing table associated with the first site to determine whether the second site is an active state or an inactive state, thereby determining whether a direct tunnel is established between the first site and the second site. If, at step 220, it is determined based on the state of the second site that a direct tunnel is established between the first site and the second site (i.e., the state of the second site is active), the method 200 may proceed to step 225, wherein the initial packets of traffic and subsequent packets of traffic may be forwarded from the first site to the second site via the direct tunnel. At step 255, the method 200 may end.

If, however, at step 220, it is determined based on the state of the second site that a direct tunnel is not established between the first site and the second site (i.e., the state of the second site is inactive), the method 200 may proceed to step 230, wherein a determination may be made as to whether the initial packets of traffic satisfy a configured trigger (configured at the first site) for establishing the direct tunnel between the first site and the second site. In other words, if the initial packets of traffic satisfy the configured trigger, then the direct tunnel may be established between the first site and the second site. In an embodiment, one trigger may be configured. However, it is to be understood that the disclosure is not to be limited and that more than one trigger or a combination of triggers may also be configured. The configured trigger may include: 1) a packet-based trigger; 2) an application-based trigger; and/or 3) a flow duration trigger. Each of these will be described in turn.

For a packet-based trigger, any traffic (independent on type, size, flow duration, etc.) may trigger the establishing of the on-demand direct tunnel. As such, for a packet-based trigger, the "Glean Action" may be programmed for all prefixes. Thus, any traffic hitting any prefix may trigger the direct tunnel set up.

Next, for an application-based trigger, a user may configure a policy that identifies particular applications (e.g., high bandwidth or high latency applications, business-critical applications, video applications, etc.) for direct site-to-site tunnel provisioning. Thus, when traffic arrives at a site, an application classification look-up may be performed, and if the traffic matches the configured application(s), the on-demand direct tunnel may be set up.

Finally, for a flow duration trigger, a policy may be configured to enable direct tunnel setup only if the traffic exceeds a threshold flow duration. For example, a user may decide that short traffic flows (e.g., lasting a few seconds, 1 min, etc.) do not require the provisioning of direct tunnel because once the tunnel is established the traffic flow may have ended. Therefore, the flow duration trigger avoids the setting up and tearing down tunnels for traffic having a short-lived flow. The "Glean Action" may be used to observe the duration of the traffic flow received at the first site and trigger notification to the first control plane based on the configured threshold.

While the present disclosure has described three triggers that may be configured for determining whether to establish to direct tunnel, it is to be understood that the present disclosure is not to be so limited. The present disclosure contemplates that any number, manner, or combination of trigger(s) may be configured, and if satisfied, may result in the establishing of the direct tunnel.

If, at step 230, it is determined that the initial packets of traffic do not satisfy the configured trigger, the method 200 may proceed to step 235, wherein the initial packets of traffic and subsequent packets of traffic may be forwarded from the first site to the second site via the backup path. If, however, at step 230, it is determined that the initial packets of traffic do satisfy the configured trigger, the method 200 may proceed to step 240, wherein the initial packets of traffic may be forwarded by the first data plane from the first site to the second site via the backup path. In other words, because the prefix will be pointing to the "Glean Action" for the second site, these initial packets of traffic will be forwarded in accordance with the routing table associated with the first site through the backup node via the backup path.

At step 245, the first site may establish the direct tunnel between the first site and the second site. In accordance with the present disclosure, the following series of steps may establish the direct tunnel between the first site and the second site. Specifically, the first data plane may send a Glean IPC message to the first control plane to update the system state table to mark the second site as in the active state, thereby activating the flow discovery of the second site. On receiving the Glean IPC message, the first control plane may download all TLOCs learned from the second site to the first data plane of the first site and provision the direct tunnel from the first site to the second site. The first control plane may also establish a first side of a BFD session, which may trigger the transmission of echo packets from the first site to the second site via the direct tunnel provisioned from the first site to the second site. The echo packets sent from the first site may be referred to as "first echo packets" to distinguish from echo packets sent from the second site, as described below. By "provisioning" the direct tunnel, it is meant that an IPSec Tunnel is setup from the first site to the second site, thereby enabling the first side of the BFD session and triggering the transmission of first echo packets from the first site to the second site. The direct tunnel is not yet in an "UP" state and traffic is not yet flowing directly between the first site and the second site.

Meanwhile, the second site may receive the initial packets of traffic from the first site via the backup path. A second data plane associated with the second site may perform a lookup for the traffic. The source prefix will be pointing to a Glean Action for the first site and backup path, thereby triggering a series of steps from the second site to the first site, the steps corresponding in reverse to the steps described above for the provisioning of the direct tunnel from the first site to the second site. Specifically, the second data plane may send a Glean IPC message to the second control plane to update the routing table to mark the first site as in the active state, thereby activating the flow discovery of the first site. On receiving the Glean IPC message, the second control plane may download all TLOCs learned from the first site to the second data plane of the second site. Next, the second control plane may provision the direct tunnel from the second site to the first site. The second control plane may also establish a second side of the BFD session, which may trigger the transmission of echo packets from the second site to the first site via the direct tunnel provisioned from the second site to the first site. The echo packets sent from the second site may be referred to as "second echo packets" to distinguish from the first echo packets sent from the first site, as described above. The first site may accept the second side of the BFD session to receive the second echo packets transmitted from the second site to the first site via the direct tunnel provisioned from the second site to the first site.

Once it has been determined by the respective data planes that the first echo packets have been transmitted to and/or received at the second site and the second echo packets have been transmitted to and/or received at the first site, the direct tunnel may be established. In other words, since both sites have successfully sent echo packets, the direct tunnel will come to an "UP" state (as described in conjunction with routing table 170 of FIG. 1B). By "establishing" the direct tunnel, it is meant that the direct tunnel is in an "UP" state and that traffic may flow between the first site and the second site via the direct tunnel.

Once the on-demand direct tunnel is established and "UP," the direct path of the direct tunnel is considered a better path as compared to the backup path, and the backup path is deleted and the direct tunnel path is added in the first and second data planes of the first and second sites. Once the on-demand tunnel is established and "UP", at step 250, all subsequent packets of traffic may be forwarded from the first site to the second site via the direct tunnel. In an embodiment, with the exception of a direct tunnel established based on an application-based trigger, all subsequent packets of traffic from the first site to the second site may be transmitted through the direct tunnel, regardless of application type. In other words, even though the direct tunnel may have been established in response to a first traffic flow, the direct tunnel may be used for latter flows of traffic transmitted from the first site to the second site. At step 255, the method 200 may end.

In an embodiment, the method 200 may include a mechanism for idle timeout. Specifically, a threshold idle period may be established by a user, or established by default, and if the there is no traffic being transmitted through the direct tunnel for that threshold period of time (i.e., the direct tunnel is idle for the threshold period of time), as determined by the first control plane, the on-demand direct tunnel may be torn down and the designation of the second site, as reflected in the system state table, may return to the inactive state. Additionally, both the first site and the second site may track traffic activity in both directions (from the first site to the second site, as well as from the second site to the first site). Thus, activity tracked on either side of the tunnel may maintain the direct tunnel.

In sum, the systems and methods of the present disclosure may allow for establishing an on-demand direct tunnel in a hub-and-spoke topology by evaluating the state of a given remote site (i.e., active or inactive) and determining whether the traffic destined for the remote site satisfies a configured trigger for establishing the direct tunnel. The result is a mechanism that allows for network scalability and circumvention of a full-mesh deployment.

Figure 3:
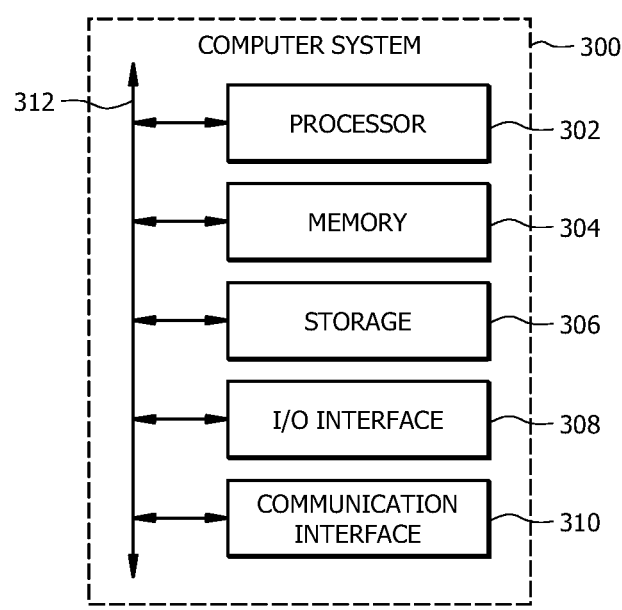
FIG. 3 illustrates a computer system, in accordance with certain embodiments.

Reference is now made to FIG. 3, wherein is shown an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:
one or more processors;
one or more computer-readable non-transitory storage media comprising instructions that, when executed by the one or more processors, cause one or more components of the system to perform operations comprising:
receiving, at a first data plane associated with a first site, initial packets of traffic to be transmitted to a second site;
determining whether a direct tunnel is established between the first site and the second site based on a state of the second site, the state comprising either an active state or an inactive state, the active state indicating that a direct tunnel is established between the first site and the second site and the inactive state indicating that the direct tunnel is not established between the first site and the second site; and
in response to determining that the direct tunnel is not established between the first site and the second site, performing the steps of:
determining that the initial packets of traffic satisfy a configured trigger for establishing the direct tunnel between the first site and the second site;
forwarding the initial packets of traffic to the second site via a backup path;
establishing the direct tunnel between the first site and the second site based at least in part on provisioning the direct tunnel from the first site to the second site and establishing a first side of a bidirectional forwarding detection (BFD) session to transmit first echo packets from the first site to the second site via the provisioned direct tunnel; and
forwarding subsequent packets of traffic from the first site to the second site via the established direct tunnel.

2. The system of claim 1, wherein the step of establishing the direct tunnel between the first site and the second site further comprises:
updating a routing table to mark the second site in the active state, thereby activating flow discovery of the second site; and
downloading transport locators (TLOCs) learned from the second site to the first data plane of the first site.

3. The system of claim 2, further comprising:
accepting a second side of the BFD session to receive second echo packets transmitted from the second site to the first site via the direct tunnel provisioned from the second site to the first site.

4. The system of claim 3, wherein a determination that the first echo packets have been transmitted to the second site and the second echo packets have been received at the first site establishes the direct tunnel.

5. The system of claim 1, wherein the configured trigger for establishing the direct tunnel comprises:
a packet trigger;
an application-based trigger; or
a flow-duration trigger.

6. The system of claim 1, wherein the direct tunnel is established on demand.

7. The system of claim 6, wherein establishing the direct tunnel on demand allows for network scalability and circumvention of a full-mesh deployment.

8. A method, comprising:
receiving, at a first data plane associated with a first site, initial packets of traffic to be transmitted to a second site;
determining whether a direct tunnel is established between the first site and the second site based on a state of the second site, the state comprising either an active state or an inactive state, the active state indicating that a direct tunnel is established between the first site and the second site and the inactive state indicating that the direct tunnel is not established between the first site and the second site; and
in response to determining that the direct tunnel is not established between the first site and the second site, performing the steps of:
determining that the initial packets of traffic satisfy a configured trigger for establishing the direct tunnel between the first site and the second site;
forwarding the initial packets of traffic to the second site via a backup path;
establishing the direct tunnel between the first site and the second site based at least in part on provisioning the direct tunnel from the first site to the second site and establishing a first side of a bidirectional forwarding detection (BFD) session to transmit first echo packets from the first site to the second site via the provisioned direct tunnel; and
forwarding subsequent packets of traffic from the first site to the second site via the established direct tunnel.

9. The method of claim 8, wherein the step of establishing the direct tunnel between the first site and the second site further comprises:
updating a routing table to mark the second site in the active state, thereby activating flow discovery of the second site;
downloading transport locators (TLOCs) learned from the second site to the first data plane of the first site.

10. The method of claim 9, further comprising:
accepting a second side of the BFD session to receive second echo packets transmitted from the second site to the first site via the direct tunnel provisioned from the second site to the first site.

11. The method of claim 10, wherein a determination that the first echo packets have been transmitted to the second site and the second echo packets have been received at the first site establishes the direct tunnel.

12. The method of claim 8, wherein the configured trigger for establishing the direct tunnel comprises:
a packet trigger;
an application-based trigger; or
a flow-duration trigger.

13. The method of claim 8, wherein the direct tunnel is established on demand.

14. The method of claim 13, wherein establishing the direct tunnel on demand allows for network scalability and circumvention of a full-mesh deployment.

15. One or more computer-readable non-transitory storage media embodying instructions that, when executed by a processor, cause performance of operations comprising:
receiving, at a first data plane associated with a first site, initial packets of traffic to be transmitted to a second site;

determining whether a direct tunnel is established between the first site and the second site based on a state of the second site, the state comprising either an active state or an inactive state, the active state indicating that a direct tunnel is established between the first site and the second site and the inactive state indicating that the direct tunnel is not established between the first site and the second site; and in response to determining that the direct tunnel is not established between the first site and the second site, performing the steps of:

determining that the initial packets of traffic satisfy a configured trigger for establishing the direct tunnel between the first site and the second site;

forwarding the initial packets of traffic to the second site via a backup path;

establishing the direct tunnel between the first site and the second site based at least in part on provisioning the direct tunnel from the first site to the second site and establishing a first side of a bidirectional forwarding detection (BFD) session to transmit first echo packets from the first site to the second site via the provisioned direct tunnel; and forwarding subsequent packets of traffic from the first site to the second site via the established direct tunnel.

16. The one or more computer-readable non-transitory storage media of claim 15, wherein the step of establishing the direct tunnel between the first site and the second site further comprises:

updating a routing table to mark the second site in the active state, thereby activating flow discovery of the second site;

downloading transport locators (TLOCs) learned from the second site to the first data plane of the first site.

17. The one or more computer-readable non-transitory storage media of claim 16, further comprising:

accepting a second side of the BFD session to receive second echo packets transmitted from the second site to the first site via the direct tunnel provisioned from the second site to the first site.

18. The one or more computer-readable non-transitory storage media of claim 17, wherein a determination that the first echo packets have been transmitted to the second site and the second echo packets have been received at the first site establishes the direct tunnel.

19. The one or more computer-readable non-transitory storage media of claim 15, wherein the configured trigger for establishing the direct tunnel comprises:

a packet trigger;

an application-based trigger; or a flow-duration trigger.

20. The one or more computer-readable non-transitory storage media of claim 15, wherein the direct tunnel is established on demand and allows for network scalability and circumvention of a full-mesh deployment.

* * * * *